(12) United States Patent
Verma et al.

(10) Patent No.: US 8,134,987 B2
(45) Date of Patent: Mar. 13, 2012

(54) METHODS AND APPARATUS FOR SPLIT POLICY ENFORCEMENT IN WIRELESS NETWORKS

(75) Inventors: Anurag Verma, Bangalore (IN); Laxminarayan Bhat, Bangalore (IN)

(73) Assignee: Symbol Technologies, Inc., Holtsville, NY (US)

( * ) Notice: Subject to any disclaimer, the term of this patent is extended or adjusted under 35 U.S.C. 154(b) by 666 days.

(21) Appl. No.: 12/267,359

(22) Filed: Nov. 7, 2008

(65) Prior Publication Data

US 2009/0129352 A1 May 21, 2009

Related U.S. Application Data

(60) Provisional application No. 60/988,969, filed on Nov. 19, 2007.

(51) Int. Cl.
*H04W 4/00* (2009.01)
*G06F 9/00* (2006.01)
*G06F 15/16* (2006.01)
*G06F 17/00* (2006.01)

(52) U.S. Cl. ............................. 370/338; 726/13; 726/14
(58) Field of Classification Search .................. 370/328; 726/11, 13, 14
See application file for complete search history.

(56) References Cited

U.S. PATENT DOCUMENTS

2006/0282887 A1* 12/2006 Trumper et al. ................ 726/11
* cited by examiner

*Primary Examiner* — Ronald Abelson

(57) ABSTRACT

A wireless local area network system allows policy enforcement execution to be split between an access port and a centralized wireless controller. The policy may be of various types, including, but not limited to, a firewall policy, a QoS policy, a traffic shaping policy, and a bandwidth-management policy. On the AP, for all the traffic that is to be bridged or forwarded to specified ports, the policy table on the AP is checked. If it matches the policy table entry, then the specified action is taken. For all the traffic that gets forwarded to the controller by the AP, the match is checked with the policy table at the controller. If a match is detected, then the appropriate action specified by the policy is taken.

16 Claims, 2 Drawing Sheets

METHODS AND APPARATUS FOR SPLIT POLICY ENFORCEMENT IN WIRELESS NETWORKS

CROSS REFERENCE

The present application claims priority to Provisional Patent Application Ser. No. 60/988,969, filed Nov. 19, 2007.

TECHNICAL FIELD

The present invention generally relates to wireless networks and, more particularly, to wireless networks (such as 802.11 networks) with policy enforcement split between the wireless switch (or wireless controller) and its associated access ports or access points.

BACKGROUND

In traditional wireless networks, such as networks including conventional access points or ports (APs) configured with 802.11a/b/g radios, it is desirable to provide some form of policy enforcement. Such policy enforcement typically involves modifying access and/or prioritizing the dataflow in accordance with various criteria. In prior art systems, the wireless switch or WLAN controller typically provides this function in its entirety.

Recently, however, APs increasingly include 802.11n radios that provide a link bandwidth of 100 Mbps or more, coupled with AP architecture ranging from single radio to multi-radio. In such a case, the traditional methods of providing policy enforcement are unsatisfactory and inefficient in a number of respects.

Accordingly, it is desirable to provide improved methods for policy enforcement in wireless networks. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description. The invention may be described herein in terms of functional and/or logical block components and various processing steps. It should be appreciated that such block components may be realized by any number of hardware, software, and/or firmware components configured to perform the specified functions. For the purposes of conciseness, conventional techniques and systems related to data communication, network systems, wireless local area networks (WLANs), communication standards (e.g., the IEEE 802.11 family of specifications), and various hypertext markup languages (e.g., HTML, XML, DHTML, etc.) are not described in detail herein.

In general, the present invention allows policy enforcement execution in a wireless network to be split between the access port and the centralized wireless controller. This results in a cost effective model, latency efficient and performance efficient model of deploying mesh AP nodes and a WLAN controller. The policy can be of various types, including, but not limited to, firewall policy, QoS policy, traffic shaping, bandwidth-management policy.

Figure 1:
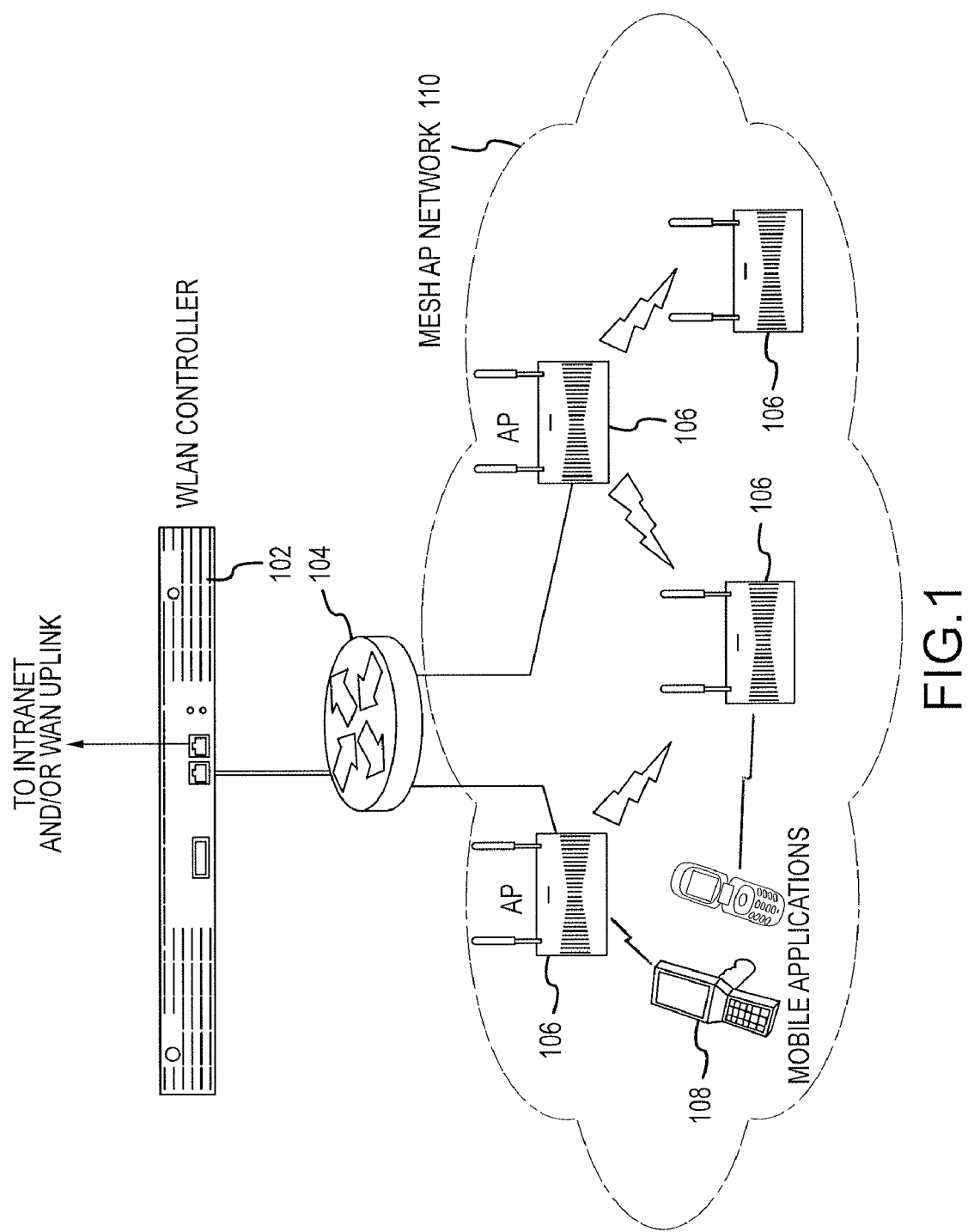
FIG. 1 depicts an exemplary wireless network useful in describing the present invention.

Referring to FIG. 1, a network in according to the present invention generally includes a mesh network 110 comprising one or more access points or ports (APs) 106 configured to communicate with one or more associated mobile units (MUs) 108. APs 106 within mesh network 110 communicate with a switch or router 104 which itself is coupled to a WLAN controller (or simply "controller") 102. WLAN controller 102 provides a link to an external network (e.g., an intranet, the Internet, or a WAN uplink). Any number of additional and/or intervening switches, routers, servers and other network components may also be present in the system.

Controller 102 and/or switch 104 determine the destination of packets receives over the network and route those packets to the appropriate AP 106 if the destination is an MU 108 with which the AP is associated. Controller 102 therefore maintains a routing list of MUs 108 and their associated APs 106. These lists are generated using a suitable packet handling process as is known in the art. Thus, each AP 106 acts primarily as a conduit, sending/receiving RF transmissions via MUs 108, and sending/receiving packets via a network protocol with controller 102.

Controller 102 can preferably support any number of devices that use wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

As described in further detail below, controller 102 includes hardware, software, and/or firmware capable of carrying out the functions described herein. Thus, controller 102 may comprise one or more processors accompanied by storage units, displays, input/output devices, an operating system, database management software, networking software, and the like. Such systems are well known in the art, and need not be described in detail. Controller 102 may be configured as a general purpose computer, a network switch, or any other such network host. In a preferred embodiment, controller 102 is modeled on a network switch architecture but includes RF network controller software (or "module")

Mesh network 110, as is known in the art, comprises a group or "mesh" of APs and other components or "nodes," wherein each node acts as a router/repeater for other nodes in the network. The nodes can be fixed pieces of network infrastructure or the MUs themselves. The result is decentralized network, as each node need only transmit as far as the next node. Nodes act as router/repeaters to transmit data from nearby nodes to peers that are remotely located, resulting in a network that can span a large distance at high data rates.

Mobile units 108 may comprise any component capable of communicating wirelessly over a network, including, for example, laptop computers, personal data assistants PDAs), RFID readers, cellular phones, and any other such devices.

In accordance with the present invention, policy enforcement (i.e., modifying access and/or prioritizing dataflow through the network in accordance with various criteria) is split between one or more APs 106, controller 102, and optionally switch 104. More particularly, a split policy model in accordance with one embodiment is provided as follows. Stated another way, the access points include a policy table configured to implement a proper subset (i.e., less than the entire set) of a set of policies associated with a wireless local area network as a whole.

Initially, an administrator or other user configures a set of policies at controller 102 or switch 104. Each policy includes an access control list (ACL) along with one or more rules associated with a specific traffic flow, a user, a user group, or an application group. Each policy or rule has an associated tag specifying which component or node should execute the policy, i.e., AP 106, switch 104, controller 102, or a combination thereof.

Figure 3:
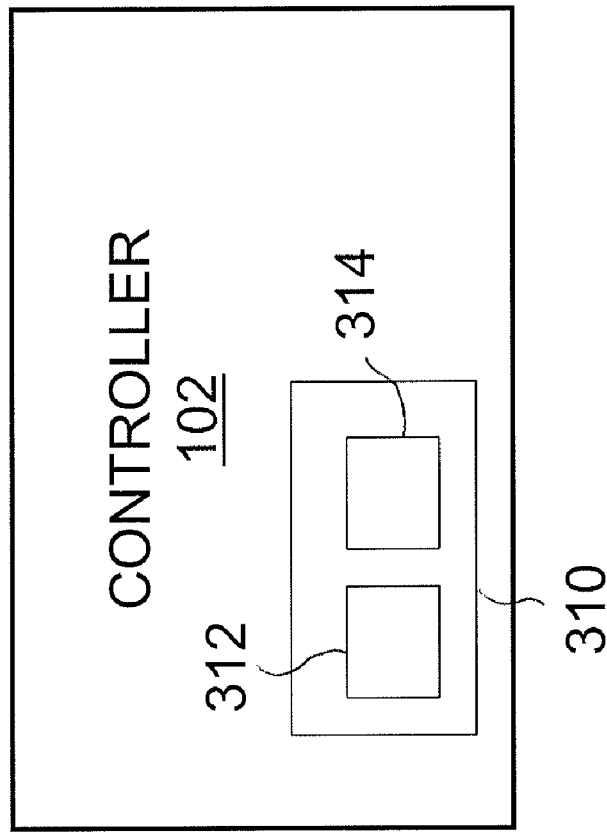
FIGS. 2 and 3 are conceptual block diagrams of an exemplary AP and controller in accordance with one embodiment.
Figure 2:
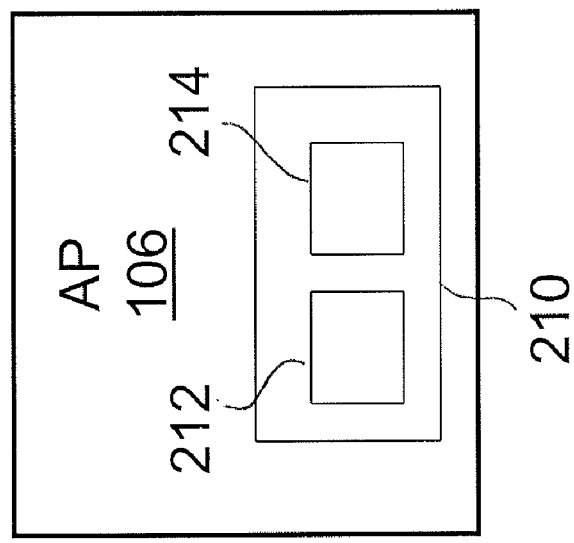

More particularly, referring to the conceptual block diagrams shown in FIGS. 2 and 3, an exemplary AP 106 includes a set of policies (or "policy table") 210, and an exemplary controller 102 includes a second set of policies (or "policy table") 310. Policies 210 include an ACL 212, and policies 310 include an ACL 312. Similarly, policies 210 include a set of rules 214, while policies 310 include a set of rules 314. The first and second policy tables 210 and 310 collectively include all policies required for the policy enforcement in the network.

The policies 210, 310 can be specified using an ACL 212, 312 or can be configured on a per user/user group basis. Each rule 214, 314 suitably specifies the traffic classifiers—e.g., source traffic, destination traffic—along with an action to be taken if the traffic matches the traffic classifier. The actions may include, for example, (a) permit traffic, (b) deny traffic, (c) mark traffic (802.1p or TOS), (d) percent allocation of traffic on radio/link, or (e) rate limiting per user/user group.

In the above example, (a) and (b) are firewall policies, (c) is a quality-of-service (QoS) policy, and (d) and (e) are bandwidth policies. Some policies by default are best enforced or executed at AP 106, while other policies are best enforced at the gateway (e.g. switch 104) or controller 102. For example, the policy of "bandwidth allocation of a WLAN on a specific AP radio" is best enforced at AP 106, as it is a radio-related policy. The policy of "rate limiting a user or user group on the Internet uplink," on the other hand, is best enforced by controller 102. Similarly, the policy of "bandwidth allocation for voice phone application across the entire network" is best enforced by controller 102. In one embodiment, the administrator can define the enforcement points of the policy based on the specific network and application implementation.

The tags describing the enforcement point of each policy may be either manually configured by the policy administrator or, alternatively, automatically by an algorithm implemented by AP 106 and controller 102 to derive the appropriate policy/ACL tables 210, 310 from the master policy table. The policy table 210, which comprises a set of policies tagged for enforcement at the AP 106, is preferably pushed to the AP 106 nodes. The mechanism of pushing is implementation-specific, and may be done, for example, using a management protocol such as SNMP, XML, or the like.

Within a particular AP 106, for all the traffic that is to be bridged or forwarded on the specified ports, a match is checked with the policy table 210 on the AP 106. If the item matches the policy table entry, then the specified action is taken. For all traffic that gets forwarded to controller 102 by the AP 106, the match is checked with the policy table 310 at controller 102. If a match is detected then the appropriate action specified by the policy is taken.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention and the legal equivalents thereof.

The invention claimed is:

1. A wireless local area network of the type including a controller and at least one access point, wherein policy enforcement for the wireless local area network is performed in part by both the controller and in part the access point, and wherein policy enforcement is conducted in accordance with policies included in a first policy table that includes: an access control list associated with the wireless local area network; and a set of rules associated with the access control list.

2. The wireless local area network of claim 1, wherein the controller includes the first policy table associated with the network, and the access point includes a second policy table associated with the network, and the first and second policy tables collectively include all policies required for the policy enforcement.

3. The wireless local area network of claim 2, wherein the second policy table includes: an access control list associated with the wireless local area network; and a set of rules associated with the access control list.

4. The wireless local area network of claim 2, wherein at least one of the first policy table and the second policy table include at least one quality-of-service rule.

5. The wireless local area network of claim 2, wherein at least one of the first policy table and the second policy table include at least one bandwidth rule.

6. The wireless local area network of claim 1, wherein, each policy has an associated enforcement point corresponding to either the access point or the controller.

7. The wireless local area network of claim 6, wherein the enforcement point associated with each policy is configured by an algorithm.

8. The wireless local area network of claim 2, wherein the second policy table is pushed to the access point by the controller.

9. A method of performing policy enforcement in a wireless local area network of the type including a controller and at least one access point, comprising the steps of:

determining an enforcement point of each of a set of policies associated with the network, wherein the enforcement point is one of the controller and the access point;

providing, within the controller, a first policy table associated with policies having an enforcement point corresponding to the controller, wherein the first policy table includes: an access control list associated with the wireless local area network; and a set of rules associated with the access control list;

providing, within the access point, a second policy table associated with policies having an enforcement point corresponding to the access point;

receiving data traffic;

comparing the data traffic with at least one of the first set of policies and the second set of policies to determine a matched policy; and taking an action, with respect to the data traffic, as specified by the matched policy.

10. The method of claim 9, wherein the second policy table includes: an access control list associated with the wireless local area network; and a set of rules associated with the access control list.

11. The method of claim 9, wherein at least one of the first policy table and the second policy table include at least one quality-of-service rule.

12. The method of claim 9, wherein at least one of the first policy table and the second policy table include at least one bandwidth rule.

13. The method of claim 9, further including the step of configuring the enforcement points based on an algorithm.

14. The method of claim 9, wherein providing the second policy table includes pushing the second policy table to the access point from the controller.

15. An access point configured to store a policy table consisting of a proper subset of a set of policies associated with a wireless local area network for which the access point is adapted, wherein the policy table includes: an access control list associated with the wireless local area network; and a set of rules associated with the access control list.

16. The access point of claim 15, further configured to receive the policy table over the network from a controller.

* * * * *